(12) United States Patent
Chin (10) Patent No.: US 10,778,958 B2
(45) Date of Patent: Sep. 15, 2020

(54) STEREOSCOPIC IMAGE CAPTURING MODULE AND METHOD FOR CAPTURING STEREOSCOPIC IMAGES

(71) Applicant: SILICON TOUCH TECHNOLOGY INC., Hsinchu (TW)

(72) Inventor: Chi-Yuan Chin, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/382,793

(22) Filed: Apr. 12, 2019

(65) Prior Publication Data

US 2019/0335157 A1    Oct. 31, 2019

(30) Foreign Application Priority Data

Apr. 27, 2018  (TW) .............................. 107114564 A (51) Int. Cl.
*H04N 13/204* (2018.01)
*G02B 5/20* (2006.01)
*G02B 27/09* (2006.01)

(52) U.S. Cl.
CPC ............. *H04N 13/204* (2018.05); *G02B 5/20* (2013.01); *G02B 27/0955* (2013.01)

(58) Field of Classification Search
CPC ....... G02B 5/20; H04N 13/204; H04N 13/361
See application file for complete search history.

(56) References Cited

U.S. PATENT DOCUMENTS

| 8,610,841 | B2 | 12/2013 | Kuhlman et al. |
| 2002/0067467 | A1 | 6/2002 | Dorval et al. |
| 2002/0135673 | A1 | 9/2002 | Favalora et al. |
| 2003/0174208 | A1 | 9/2003 | Glukhovsky et al. |
| 2010/0097444 | A1* | 4/2010 | Lablans ............ H04N 5/23238 348/46 |
| 2011/0018974 | A1 | 1/2011 | Wang |
| 2012/0026417 | A1 | 2/2012 | Yamamoto et al. |

(Continued)

FOREIGN PATENT DOCUMENTS

| CN | 105991990 A | 10/2016 |
| EP | 1510080 B1 | 9/2015 |

(Continued)

*Primary Examiner* — Zhubing Ren
(74) *Attorney, Agent, or Firm* — Li & Cai Intellectual Property (USA) Office (57) ABSTRACT

A stereoscopic image capturing module includes a lens set, a light-filtering element, an image sensing unit and an image processing unit electrically connected with the image sensing unit. The lens set and the light-filtering element are disposed on the same side of the image sensing unit. The light-filtering element includes a substrate and a covering layer disposed thereon. The covering layer includes a first light-permeable section and a second light-permeable section. A first light beam having a first spectrum and a second light beam having a second spectrum pass through the first and second light-permeable sections, respectively, and are received by the image sensing unit, so the image sensing unit obtains a first image signal and a second image signal. The first and second spectrums are different from each other. The first and second image signals are processed by the image processing unit to form stereoscopic image information.

10 Claims, 7 Drawing Sheets

(56) References Cited

U.S. PATENT DOCUMENTS

| | | | |
|---|---|---|---|
| 2012/0056988 A1 | 3/2012 | Stanhill et al. | |
| 2013/0155194 A1 | 6/2013 | Sacre et al. | |
| 2014/0028924 A1* | 1/2014 | Yamaguchi | G02F 1/29 349/1 |
| 2016/0206187 A1* | 7/2016 | Shahinian | A61B 1/045 |
| 2017/0148169 A1* | 5/2017 | Kyung | H04N 9/045 |

FOREIGN PATENT DOCUMENTS

| | | |
|---|---|---|
| JP | 2003265405 A | 9/2003 |
| JP | 2010268444 A | 11/2010 |
| JP | 201317138 A | 1/2013 |
| KR | 1020130069503 A | 6/2013 |
| TW | 498182 | 8/2002 |
| TW | 540228 | 7/2003 |
| TW | I349477 B | 9/2011 |
| TW | 201523117 A | 6/2015 |
| TW | 201544848 A | 12/2015 |
| TW | I564593 B | 1/2017 |
| WO | 2017127994 A1 | 8/2017 |

* cited by examiner

STEREOSCOPIC IMAGE CAPTURING MODULE AND METHOD FOR CAPTURING STEREOSCOPIC IMAGES

CROSS-REFERENCE TO RELATED PATENT APPLICATION

This application claims the benefit of priority to Taiwan Patent Application No. 107114564, filed on Apr. 27, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an image capturing module and a method for capturing images, and more particularly to a stereoscopic image capturing module and a method for capturing stereoscopic images.

BACKGROUND OF THE DISCLOSURE

A conventional lens module for capturing images may include a lens set for guiding light and allowing light to pass through, and the light passing through the lens group is received by an image sensor and converted into an image signal. With the development of technology, stereoscopic image capturing technique has become one popular image capturing technique.

One of the stereoscopic image capturing techniques is Anaglyph, which generates stereoscopic effects by using different filters to separately encode the two eyes of an observer. Specifically, a stereoscopic image produced by Anaglyph contains two images obtained by using light filtered through different filter elements. By performing image processing on these two images, stereoscopic images can be observed by the observer, as the visual cortex of the brain of the observer merges the two images into a stereoscopic image.

However, conventionally, in order to obtain images formed by two lights filtered by different filter elements, two sets of lenses must be used to acquire the images respectively. In detail, it is generally necessary to use a set of lenses provided with a first filter element (for example, a green filter) to acquire a first image, and another set of lenses provided with a second filter element (for example, a red filter) to acquire the second image. Lastly, the two images are processed. Such a structural design is disadvantageous for current miniaturized electronic devices. For example, the size of a portable electronic device, such as a mobile phone, a tablet computer, or a smart watch, renders a design adopting large lens therein rather inapplicable. Therefore, there is still room for improvement for a conventional stereoscopic image capture module.

SUMMARY OF THE DISCLOSURE

In response to the above-referenced technical inadequacies, the present disclosure provides a stereoscopic image capturing module and a method for capturing stereoscopic images, which uses a single lens to capture different images formed by lights having different spectrums, and reduces the volume and the manufacturing costs of products applied with the stereoscopic image capturing module of the present application.

In one aspect, the present disclosure provides a stereoscopic image capturing module including a lens set, a light-filtering element, an image sensing unit and an image processing unit. The light-filtering element includes a substrate and a covering layer disposed on the substrate. The covering layer has a first light-permeable section and a second light-permeable section. The first light-permeable section allows a first light beam having a first spectrum to pass through it. The second light-permeable section allows a second light beam having a second spectrum different from the first spectrum to pass through it. The image sensing unit receives the first light beam and the second light beam, and obtains a first image signal according to the first light beam and a second image signal according to the second light beam. The lens set and the light-filtering element are disposed on the same side of the image sensing unit. The image processing unit is electrically connected with the image sensing unit, and forms a piece of stereoscopic image information according to the first image signal and the second image signal.

In one aspect, the present disclosure provides a stereoscopic image capturing method. The stereoscopic image capturing method includes: passing a first light beam having a first spectrum and a second light beam having a second spectrum different from the first spectrum respectively through a first light-permeable section and a second light-permeable section of a covering layer of a light-filtering element, and the covering layer is disposed on a substrate of the light-filtering element; performing optical processing on at least one of the first light beam and the second light beam by a lens set; receiving the first light beam already passed through the first light-permeable section and the second light beam already passed through the second light-permeable section by an image sensing unit, so that the image sensing unit obtains a first image signal and a second image signal; and forming a piece of stereoscopic image information according to the first image signal and the second image signal by an image processing of an image processing unit.

Therefore, through the technical features of "the first light beam having a first spectrum passes through the first light-permeable section and is received by the image sensing unit, so that the image sensing unit obtains a first image signal; the second light beam having a second spectrum passes through the second light-permeable section and is received by the image sensing unit, so that the image sensing unit obtains a second image signal; and the first spectrum is different from the second spectrum," and "the first and second light beams respectively pass through the first and second light-permeable sections; and the image sensing unit receives the first light beam already passed through the first light-permeable and the second light beam already passed through the second light-permeable, so that the light sensing unit obtains the first image signal and the second image signal," the stereoscopic image capturing module and the stereoscopic image capturing method provided by the present disclosure can reduce the structural complexity, volume, and manufacturing costs of the stereoscopic image capturing module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
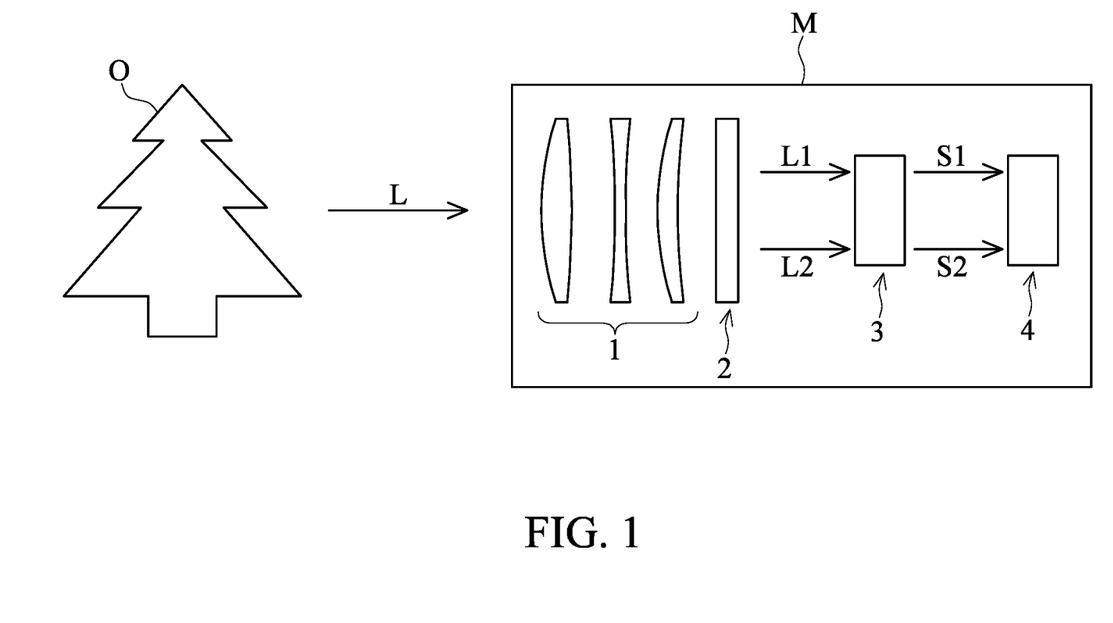
FIG. 1 is a schematic diagram of a stereoscopic image capturing module according to certain embodiments of the present disclosure.

Referring to FIG. 1, a stereoscopic image capturing module M according to certain embodiments of the present disclosure includes a lens set 1, a light-filtering element 2, an image sensing unit 3 and an image processing unit 4. The lens set 1 and the light-filtering element 2 are disposed on the same side of the image sensing unit 3. The image processing unit 4 is electrically connected with the image sensing unit 3. Further, in certain embodiments of the present disclosure, an order of the lens set 1, the light-filtering element 2 and the image sensing unit 3 can be that shown in FIG. 1, that is, the light-filtering element 2 is disposed between the lens set 1 and the image sensing unit 3, or the lens set 1 is disposed between the light-filtering element 2 and the image sensing unit 3. That is to say, an order of the lens set 1 and the light-filtering element 2 is not limited in the present disclosure.

Further, the lens set 1 according to certain embodiments of the present disclosure includes a plurality of lenses. For example, the lens set 1 has light-concentrating and light-guiding functions. However, neither the type nor the amount of the lens of the lens set 1 is limited in the present disclosure, which can be adjusted and chosen in certain ways based on particular implementations. The lens set 1 is configured to allow lights to pass through to be received by the image sensing unit 3 disposed on a side of the lens set 1.

Figure 2:
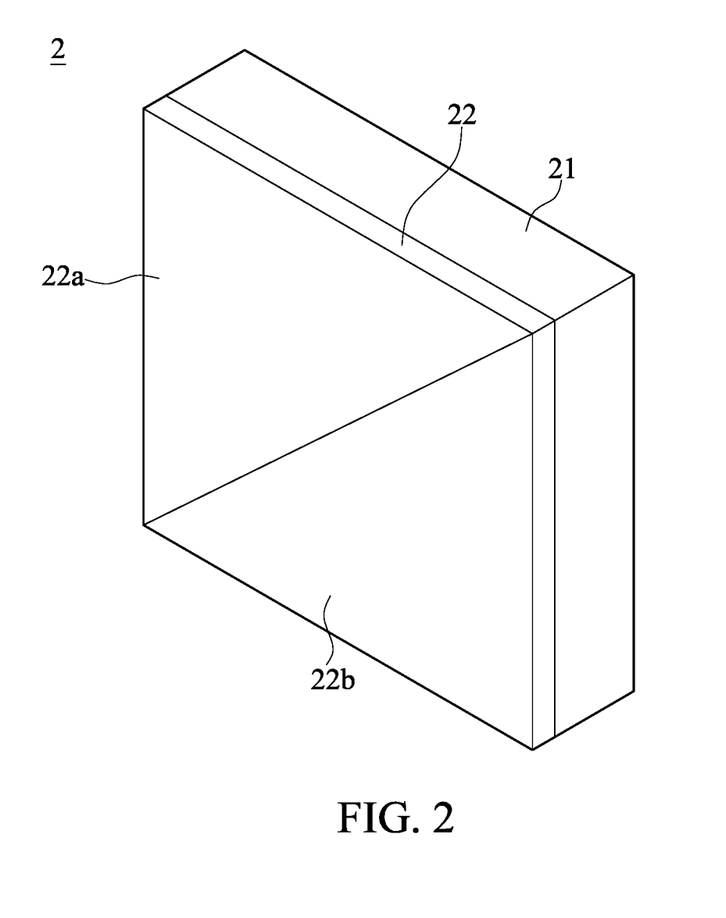
FIG. 2 is a schematic diagram of one configuration of a light-filtering element of the stereoscopic image capturing module according to certain embodiments of the present disclosure.

Referring again to FIG. 1, and also to FIG. 2, the light-filtering element 2 is used to allow lights with a particular spectrum to pass through it so as to achieve light-filtering effects. Specifically, a surface of the light-filtering element 2 used to allow lights to pass through is sectioned or divided into sections where different lights with different spectrums are allowed to pass. The light-filtering element 2 includes a substrate 21 and a covering layer 22 disposed on the substrate 21.

Further, the substrate 21 can be a glass substrate having a thickness between 0.01 mm and 0.05 mm. In order to be applied to nowadays electric devices, which are getting miniaturized, the size of the stereoscopic image capturing module M according to certain embodiments of the present disclosure has to be controlled to be smaller. As a result, when designing the structure of the light-filtering element 2, the substrate 21 is preferably a glass substrate having a smaller thickness. Otherwise, the appeal of lightness and portability of a product containing the stereoscopic image capturing module M would not be realized.

Further, the covering layer 22 disposed on the substrate 21 can be formed on the substrate 21 through any known coating technique. For example, materials can be deposited on the substrate 21 through chemical vapor deposition techniques so as to form the covering layer 22. As discussed above, in certain embodiments of the present disclosure, the surface of the light-filtering element 2 used to allow light to pass through is sectioned or divided into sections where different lights with different spectrums are allowed to pass. In certain embodiments, the covering layer 22 includes a first light-permeable section 22a and a second light-permeable section 22b.

The number and characteristics of the light-permeable sections of the covering layer 22 of the light-filtering element 2 are not limited in the present disclosure as long as the intended effects of the light-filtering element 2 can be achieved, that is, allowing lights with different spectrums to pass through to achieve the stereoscopic image capturing function. For example, the covering layer 22 of the light-filtering element 2 can include two, three or four or more light-permeable sections not overlapping each other.

Figure 3:
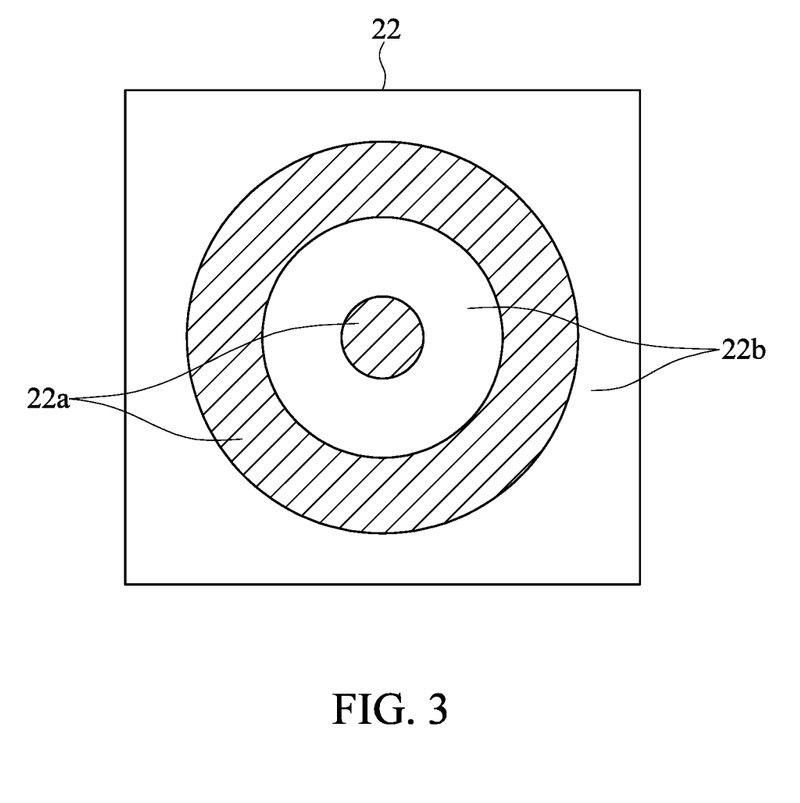
FIG. 3 is a schematic diagram of another configuration of the light-filtering element of the stereoscopic image capturing module according to certain embodiments of the present disclosure.

Reference is made to FIG. 2 and FIG. 3. In the embodiments shown in FIG. 2, the covering layer 22 of the light-filtering element 2 includes two light-permeable sections not overlapping each other, that is, the first light-permeable section 22a and the second light-permeable section 22b. In addition, each of the first light-permeable section 22a and the second light-permeable section 22b is a continuous area, and accounts for around half the area of the surface of the covering layer 22.

In the embodiments shown in FIG. 3, the covering layer 22 of the light-filtering element 2 also includes the first light-permeable section 22a and the second light-permeable section 22b. However, different from the embodiments shown in FIG. 2, each of the first light-permeable section 22a and the second light-permeable section 22b in the embodiments shown in FIG. 3 includes discontinuous light-permeable sections (unlabeled). That is, in certain embodiments of the present disclosure, the first light-permeable section 22a and the second light-permeable section 22b can be arranged alternatively.

Further, the shape of the light-filtering element 2 is not limited to the rectangles shown in FIG. 2 and FIG. 3. For example, the light-filtering element 2 can be in a circular shape or in other shapes.

Next, reference is made again to FIG. 1 and FIG. 2. The first light-permeable section 22a allows a first light beam L1 having a first spectrum to pass through, and the second light-permeable section 22b allows a second light beam L2 having a second spectrum to pass through. The first light beam L1 and the second light beam L2 respectively passing through the first light-permeable section 22a and the second light-permeable section 22b are received by the image sensing unit 3, so that the image sensing unit 3 obtains a first image signal S1 and a second image signal S2.

In other words, as shown in FIG. 1, when conducting the image capturing operation, the light L from an object O (for example, the light reflected by the objected O) can includes light beams having different spectrums, for example, the first light beam L1 having the first spectrum and the second light beam L2 having the second spectrum. The first light beam L1 and the second light beam L2 pass through the lens set 1 and the light-filtering element 2, and are received by the image sensing unit 3.

Specifically, the first light beam L1 having the first spectrum passes through the first light-permeable section 22a and is received by the image sensing unit 3, so that the image sensing unit 3 obtains the first image signal S1. The second light beam L2 having the second spectrum passes through the second light-permeable section 22b and is received by the image sensing unit 3, so that the image sensing unit 3 obtains the second image signal S2.

The image sensing unit 3 can include a charge-coupled device (CCD) or a complementary metal-oxide-semiconductor (CMOS). However, the present disclosure is not limited thereto.

It is noted that the first spectrum is different from the second spectrum. For example, the first spectrum is a blue-light spectrum, and the second spectrum is a red-light spectrum. In certain embodiments, the first spectrum and the second spectrum are approximately chromatically opposite spectrums, for example, being red and cyan, respectively. By adopting the two chromatically opposite spectrums, a stereoscopic image can be produced. For example, the first light beam L1 can be a red light beam, and the second light beam L2 can be a blue light beam.

Further, the first light-permeable section 22a can be formed by a first light-permeable material, and the second light-permeable section 22b can be formed by a second light-permeable material different from the first light-permeable material. For example, the first light-permeable material and the second light-permeable material can be $SiO_2$, $TiO_2$ or a laminated material formed by $SiO_2$ and $TiO_2$. For example, the covering layer 22 of the light-filtering element 2 can be a coating formed by alternately coating the light-filtering element 2 with $SiO_2$ and $TiO_2$.

Further, in certain embodiments, the first light beam L1 has the first spectrum, and the second light beam L2 has the second spectrum different from the first spectrum. The first light beam L1 includes a first light having a single frequency or two or more different frequencies. The second light beam L2 includes a second light having a single frequency or two or more different frequencies. The first light beam L1 and the second light beam L2 have different frequency ranges. In other words, the first light beam L1 and the second light beam L2 includes lights having different frequency ranges.

Next, reference is made again to FIG. 1. The first light beam L1 and the second light beam L2 respectively pass through different sections of the covering layer 22 of the light-filtering element 2, and are received by the image sensing unit 3. The image sensing unit 3 converts the received first light beam L1 and the second light beam L2 into the first image signal S1 and the second image signal S2, and sends the first image signal S1 and the second image signal S2 to the image processing unit 4 for image processing.

In certain embodiments, the first image signal S1 and the second image signal S2 are processed by the image processing unit 4 to form stereoscopic image information. The image processing unit 4 includes a processor configured to conduct image processing, such as a microprocessor. However, the present disclosure is not limited thereto.

Further, the first light beam L1 which has already passed through the light-filtering element 2 is converted into the first image signal S1 (a first image) after being received by the image sensing unit 3. The second light beam L2 which has already passed through the light-filtering element 2 is converted into the second image signal S2 (a second image) after being received by the image sensing unit 3. Next, the image processing unit 4 combines the image signals (the first image signal S1 and the second image signal S2) through the Anaglyph technique, which is a three-dimensional coding technique, to produce a stereoscopic effect, that is, combining the image signals to produce a stereoscopic image.

Figure 7:
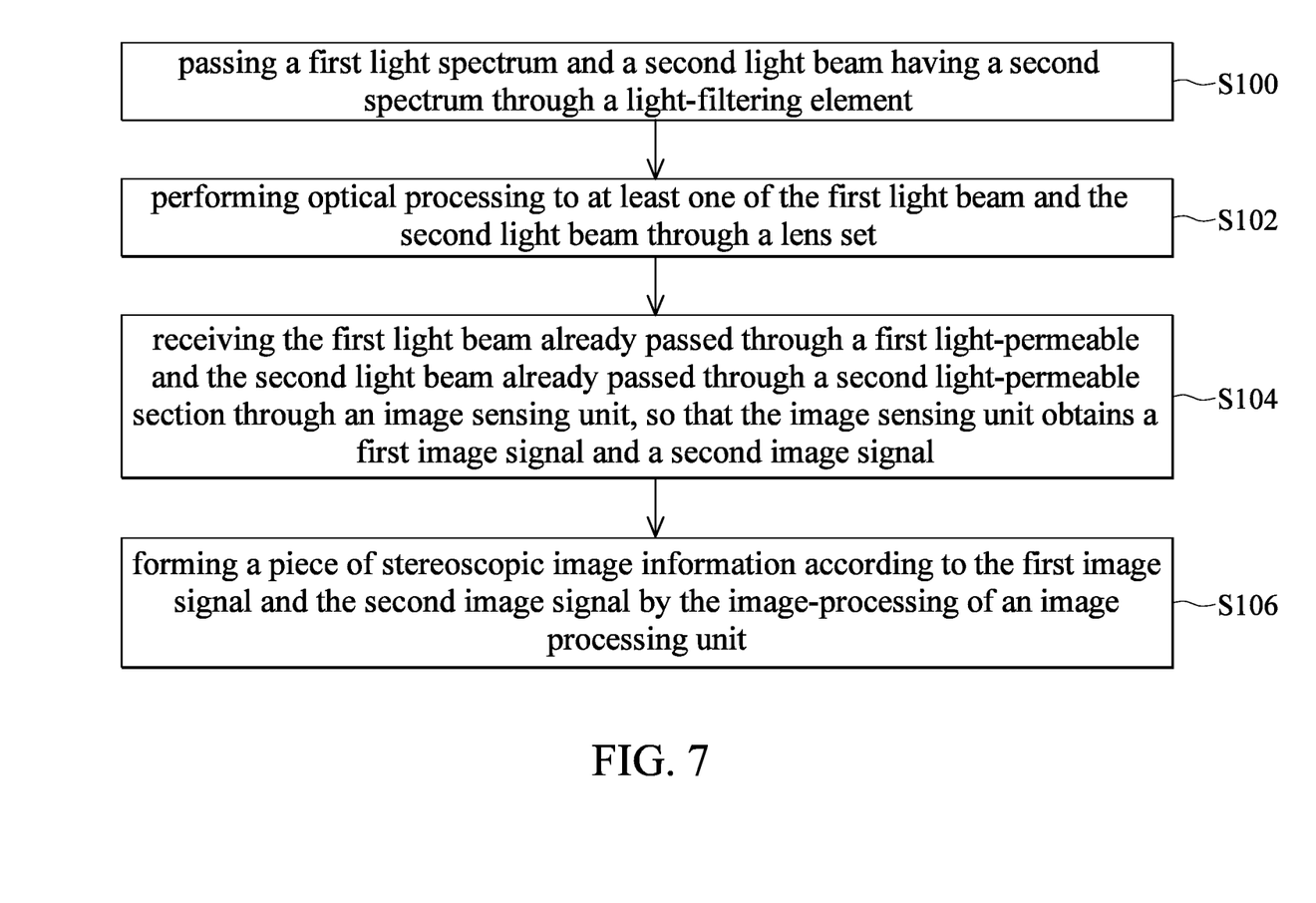
FIG. 7 is a flowchart of a stereoscopic image capturing method according to certain embodiments of the present disclosure.

Based on the stereoscopic image capturing module M, certain embodiments of the present disclosure further provide a stereoscopic image capturing method. Reference is made to FIG. 7, which is a flowchart of the stereoscopic image capturing method according to certain embodiments of the present disclosure.

As shown in FIG. 7, first, the first light beam L1 having the first spectrum and the second light beam L2 having the second spectrum pass through the light-filtering element 2 (Step S100). As discussed above, the light-filtering element 2 includes the substrate 21 and the covering layer 22 disposed on the substrate 21. The covering layer 22 includes the first light-permeable section 22a and the second light-permeable section 22b. The first light beam L1 and the second light beam L2 respectively pass through the first light-permeable section 22a and the second light-permeable section 22b. The first spectrum is different from the second spectrum.

In step S100, the specially designed light-filtering element 2, that is, the light-filtering element 2 having the first light-permeable section 22a and the second light-permeable section 22b (both belong to the covering layer 22), filters light beams having different spectrums at different time points, so as to obtain different images (different image signals).

Further, the stereoscopic image capturing method further includes: performing optical processing on at least one of the first light beam L1 and the second light beam L2 (Step S102). It should be noted that steps S100 and S102 of the stereoscopic image capturing method of the present disclosure are not necessary to be conducted in the order as discussed above. For example, in the embodiments in FIG. 1, the first light beam L1 and the second light beam L2 first pass through the lens set 1 and then undergo optical processing, such as being focused, and then pass through the light-filtering element 2.

Next, the first light beam L1 already passed through the first light-permeable section 22a and the second light beam L2 already passed through the second light-permeable section 22b are received by the image sensing unit 3, so that the image sensing unit 3 can obtain the first image signal S1 and the second image signal S2 (Step S104). Since the first light beam L1 and the second light beam L2 first pass through the lens set 1 and the light-filtering element 2, and then are received by the image sensing unit 3, the step S104 is performed after steps S100 and S102.

Further, the stereoscopic image capturing method further includes: the first image signal S1 and the second image signal S2 being processed by the image processing unit 4 to form the piece of stereoscopic image information (S106). As discussed above, the image processing unit 4, such as the microprocessor, can combine the first image signal S1 and the second image signal S2 through the Anaglyph to produce the stereoscopic effects, that is, combining the first image signal S1 and the second image signal S2 into a stereoscopic image.

Next, the details of the stereoscopic image capturing module M and the stereoscopic image capturing method of certain embodiments of the present disclosure are elaborated as follows using different embodiments as examples.

First Embodiment

Figure 4:
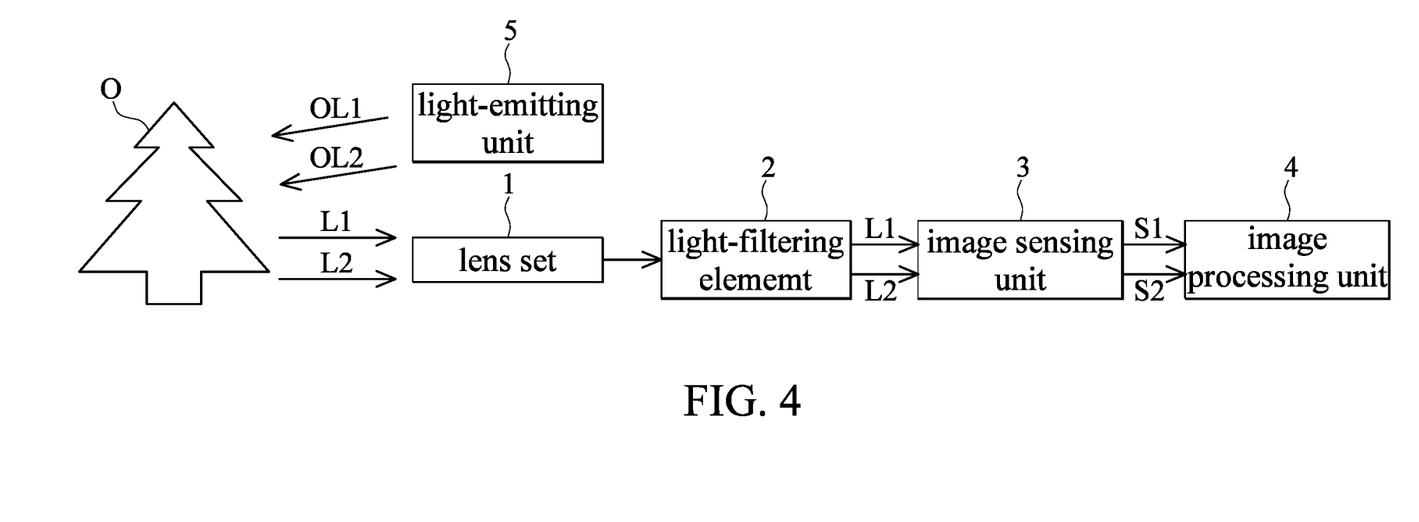
FIG. 4 is a schematic diagram of the signal transmission of a stereoscopic image capturing module according to a first embodiment of the present disclosure.

Reference is made to FIG. 4, which is a schematic diagram of the signal transmission of the stereoscopic image capturing module M according to a first embodiment of the present disclosure.

The stereoscopic image capturing module M of the present disclosure further includes a light-emitting unit 5. The light-emitting unit 5 can be electrically connected with the image processing unit 4. The light-emitting unit 5 can be any light-emitting component known to be applicable to a stereoscopic image capturing module. For example, the light-emitting unit 5 can include a light-emitting diode (LED). In certain embodiments of the present disclosure, the light-emitting unit 5 includes at least two LEDs emitting original light beams with different spectrums. The two LEDs can be controlled to emit the light beams at predetermined time points. For example, the light-emitting unit 5 includes a red light LED and a blue light LED for respectively emitting a first original light beam OL1 (a red light beam) and a second original light beam OL2 (a blue light beam).

The first original light beam OL1 and the second original light beam OL2 generated by the light-emitting unit 5 are reflected by the object O to be measured to form the first light beam L1 and the second light beam L2, and the first light beam L1 and the second light beam L2 pass through the light-filtering element 2 at different time points. That is, in the first embodiment of the present disclosure, the light-emitting unit 5 emits at least two original light beams (the first original light beam OL1 and the second original light beam OL2) having different spectrums so that the first light beam L1 having the first spectrum and the second light beam L2 having the second spectrum are formed after the at least two original light beams are reflected by the object O to be measured.

Further, the first light beam L1 and the second light beam L2 pass through the light-filtering element 2 at different time points and are received by the image sensing unit 3, so as to produce the first image signal S1 and the second image signal S2. The first image signal S1 and the second image signal S2 are processed by the image processing unit 4 to form the stereoscopic image.

Based on the above structural adjustment to the stereoscopic image capturing module M, in the first embodiment of the present disclosure, the stereoscopic image capturing method further includes the following steps: generating the first original light beam OL1 and the second original light beam OL2 by the light-emitting unit 5, and reflecting the first original light beam OL1 and the second original light beam OL2 by the object O to be measured to form the first light beam L1 and the second light beam L2, and the first light beam L1 and the second light beam L2 pass through the light-filtering element 2 at different time points.

Second Embodiment

Figure 5:
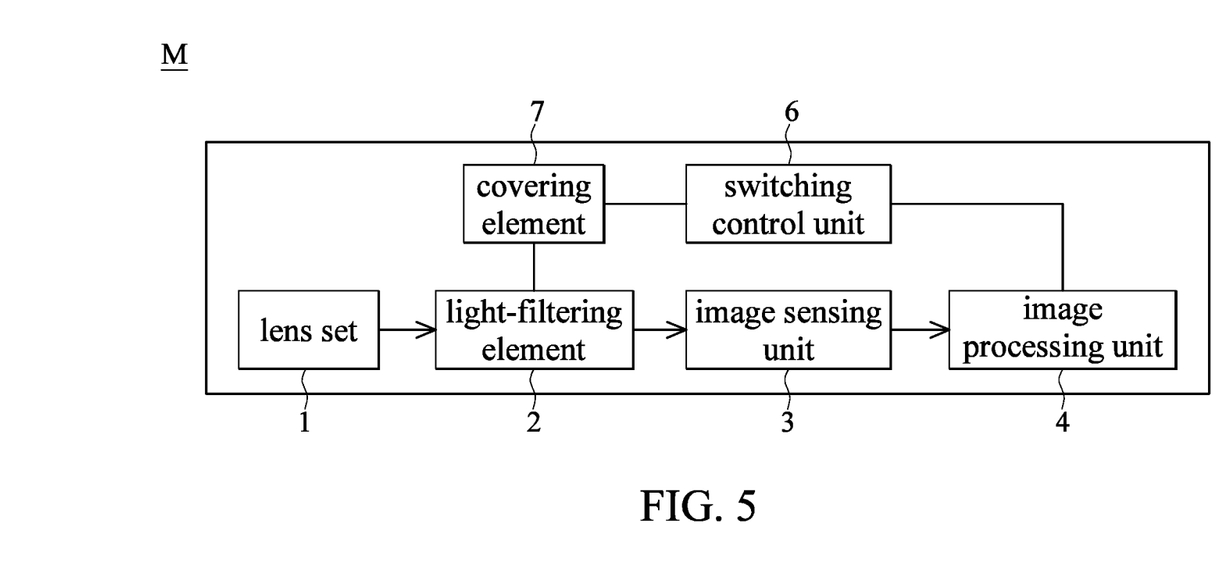
FIG. 5 is a block diagram of a stereoscopic image capturing module according to a second embodiment of the present disclosure.
Figure 6:
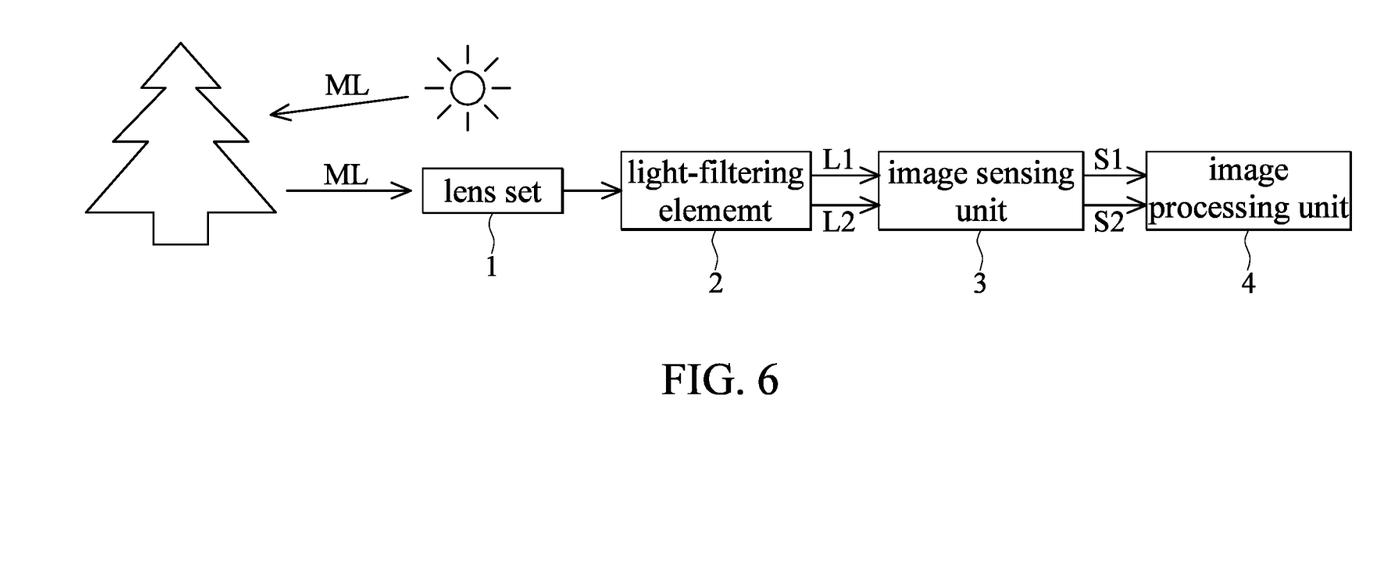
FIG. 6 is a schematic diagram of the signal transmission of the stereoscopic image capturing module according to the second embodiment of the present disclosure.

Next, reference is made to FIG. 5 and FIG. 6. FIG. 5 is a block diagram of the stereoscopic image capturing module M according to a second embodiment of the present disclosure. FIG. 6 is a schematic diagram of the signal transmission of the stereoscopic image capturing module M according to the second embodiment of the present disclosure.

By comparing FIG. 6 with FIG. 4, it should be understandable that a difference between the first embodiment and the second embodiment includes a different source of the light beams (a different light source). Further, as shown in FIG. 5, the stereoscopic image capturing module M according to the second embodiment further includes a switching control unit 6 and a covering element 7.

First, in the second embodiment, the first light beam L1 and the second light beam L2 are formed by the object O to be measured reflecting a mixed light ML. Compared to the first embodiment adopting the original light beams (the first original light beam OL1 and the second original light beam OL2) controlled to be emitted at different time points and having different characteristics (such as different spectrums), the second embodiment adopts the mixed light ML having at least the first original light beam OL1 and the second original light beam OL2 as the light source. For example, the stereoscopic image capturing module M according to the second embodiment does not need the light-emitting unit 5; rather, it uses ambient light, such as sunlight, as the light source.

With the light source adjustment, as discussed above, the stereoscopic image capturing module M according to the second embodiment further includes the switching control unit 6 and the covering element 7. Specifically, the switching control unit 6 is electrically connected with the covering element 7. Further, the covering element 7 works in coordination with the light-filtering element 2. For example, the covering element 7 can be controlled by the switching control unit 6 to cover a portion of the light filtering element 2, so as to control the type of the light beam passing through the light-filtering element 2 at different time points.

For example, the covering element 7 is controlled by the switching control unit 6 to cover the first light-permeable section 22a or the second light-permeable section 22b at different time points, so that the mixed light ML having at least the first original light beam OL1 and the second original light beam OL2 is reflected by the object O to be measured to form the first light beam L1 and the second light beam L2. The first light beam L1 and the second light beam L2 pass through the light-filtering element 2 at different time points.

In certain embodiments, the reflected light of the mixed light ML being reflected by the object O to be measured includes the first light beam L1 and the second light beam L2. For example, the first light beam L1 is the red light beam, and the second light beam is the blue light beam.

In addition, the first light-permeable section 22a of the covering layer 22 of the light-filtering element 2 is an area that allows the red light beam to pass through, while the blue light beam cannot pass through the first light-permeable section 22a. On the contrary, the second light-permeable section 22b of the covering layer 22 of the light-filtering element 2 is an area that allows the blue light beam to pass through, while the red light beam cannot pass through the second light-permeable section 22b.

As described above, at a first time point, the switching control unit 6 controls the covering element 7 to cover the first light-permeable section 22a of the covering layer 22 of the light-filtering element 2. As a result, after the reflected light is formed from the mixed light ML reflected by the object O to be measured, a portion of the first light beam L1 included in the reflected light is blocked by the covering element 7, and the other portion is blocked by the second light-permeable section 22b. At the same time, a portion of the second light beam L2 passes through the second light-permeable section 22b and is received by the image sensing unit 3. Therefore, at the first time point, the image sensing unit 3 only receives the second light beam L2. In other words, at the first time point, the image sensing unit 3 only receives the blue light signal and does not receive the red light signal. Next, the image sensing unit 3 converts the second light beam L2 into the second image signal S2 and sends it to the image processing unit 4.

Next, at a second time point, the switching control unit 6 controls the covering element 7 to cover the second light-permeable section 22b of the covering layer 22 of the light-filtering element 2. As a result, after the reflected light is formed from the mixed light ML reflected by the object O to be measured, a portion of the second light beam L2 included in the reflected light is blocked by the covering element 7, and the other portion is blocked by the first light-permeable section 22a. At the same time, a portion of the first light beam L1 passes through the first light-permeable section 22a and is received by the image sensing unit 3. Therefore, at the second time point, the image sensing unit 3 only receives the first light beam L1. In other words, at the second time point, the image sensing unit 3 will only receive the red light signal and will not receive the blue light signal. Next, the image sensing unit 3 converts the first light beam L1 into the first image signal S1 and sends it to the image processing unit 4.

As described above, after the image processing unit 4 receives the first image signal S1 provided by the first light beam L1 (the red light beam) and the second image signal S2 provided by the second light beam L2 (the blue light beam), the first image signal S1 and the second image signal S2 can be combined through the image processing to generate the stereoscopic image.

Accordingly, based on the structural adjustment to the stereoscopic image capturing module M, in the second embodiment of the present disclosure, the stereoscopic image capturing method further includes the following steps: controlling the covering element 7 by the switching control unit 6 to mask the first light-permeable section 22a or the second light-permeable area 22b at different time points, such that the mixed light ML having at least the first original light beam and the second original light beam is reflected by the object O to be measured to form the first light beam L1 and the second light beam L2. The first light beam L1 and the second light beam L2 pass through the light-filtering element 2 at different time points.

Through the technical features of "the first light beam L1 having the first spectrum passes through the first light-permeable section 22a and being received by the image sensing unit 3, so that the image sensing unit 3 obtains the first image signal S1; the second light beam L2 having the second spectrum passes through the second light-permeable section 22b and being received by the image sensing unit 3, so that the image sensing unit 3 obtains the second image signal S2; and the first spectrum is different from the second spectrum" and "the first and second light beams L1 and L2 respectively pass through the first and second light-permeable sections 22a and 22b; and the image sensing unit 3 receives the first light beam L1 already passed through the first light-permeable 22a and the second light beam L2 already passed through the second light-permeable 22b, so that the light sensing unit 3 obtains the first image signal S1 and the second image signal S2," the stereoscopic image capturing module M and the stereoscopic image capturing method provided by the present disclosure can reduce structural complexity and volume, and manufacturing costs.

Further, through the structural design of the light-filtering element 2, the stereoscopic image capturing module M of the present disclosure can achieve the effects of separating different light beams having different spectrums through the single light-filtering element 2. Next, through a light spectrum differentiation, the stereoscopic images can be obtained through Anaglyph. In this way, the amount of the lenses in the stereoscopic image capturing module M can be effectively reduced. In other words, the stereoscopic image capturing module M of the present application can use a single lens set to achieve the technical effect of capturing images.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A stereoscopic image capturing module, comprising:
   a lens set;
   a light-filtering element including:
      a substrate; and
      a covering layer disposed on the substrate and having a first light-permeable section for allowing a first light beam having a first spectrum to pass through; and a second light-permeable section for allowing a second light beam having a second spectrum different from the first spectrum to pass through;

an image sensing unit configured to
receive the first light beam and the second light beam; and
obtain a first image signal according to the first light beam and a second image signal according to the second light beam;

an image processing unit electrically connected with the image sensing unit and configured to form a piece of stereoscopic image information according to the first image signal and the second image signal;

a covering element configured to mask the first light-permeable section or the second light-permeable section at different time points, so that a mixed light at least including a first original light beam and a second original light beam is reflected by an object to be measured to form the first light beam and the second light beam; and a switching control unit electrically connected with the covering element and configured to control the covering element to mask the first light-permeable section or the second light-permeable section at different time points, wherein the lens set and the light-filtering element are disposed on the same side of the image sensing unit, wherein the first and the second light beams pass through the light-filtering element at different time points.

2. The stereoscopic image capturing module according to claim 1, further comprising:
a light-emitting unit configured to generate the first original light beam and the second original light beam.

3. The stereoscopic image capturing module according to claim 1, wherein the first light-permeable section is made of a first light-permeable material, and the second light-permeable section is made of a second light-permeable material.

4. The stereoscopic image capturing module according to claim 1, wherein the substrate is a glass substrate having a thickness between 0.01 mm and 0.05 mm.

5. The stereoscopic image capturing module according to claim 1, wherein the stereoscopic image information is formed by combining the first image signal and the second image signal through Anaglyph.

6. The stereoscopic image capturing module according to claim 1, wherein the first spectrum is a blue-light spectrum, and the second spectrum is a red-light spectrum.

7. The stereoscopic image capturing module according to claim 1, wherein the image-sensing unit includes a charge-coupled device or a complementary metal-oxide-semiconductor.

8. The stereoscopic image capturing module according to claim 1, wherein the first light beam includes a first light having a single frequency or two or more different frequencies, and the second light beam includes a second light having a single frequency or two or more different frequencies.

9. A stereoscopic image capturing method, comprising:
controlling, by a switching control unit, a covering element to mask a first light-permeable section or a second light-permeable section of a covering layer of a light-filtering element at different time points, so that a mixed light at least including a first original light beam and a second original light beam is reflected by an object to be measured to form a first light beam and a second light beam, and the first light beam and the second light beam pass through the light-filtering element at different time points, wherein the covering layer is disposed on a substrate of the light-filtering element;

passing a first light beam having a first spectrum and a second light beam having a second spectrum different from the first spectrum respectively through the first light-permeable section and the second light-permeable section;

performing, by a lens set, optical processing on at least one of the first light beam and the second light beam;

receiving, by an image sensing unit, the first light beam already passed through the first light-permeable section and the second light beam already passed through the second light-permeable section so that the image sensing unit obtains a first image signal and a second image signal; and forming, by an image processing unit, a piece of stereoscopic image information according to the first image signal and the second image signal.

10. The stereoscopic image capturing method according to claim 9, before the step of passing the first light beam having the first spectrum and the second light beam having the second spectrum through the light-filtering element, further comprising:
generating, by a light-emitting unit, the first original light beam and the second original light beam.

* * * * *